May 5, 1959 G. W. STEARNS ET AL 2,885,548

POWER SWITCHING NETWORK

Filed May 26, 1954

INVENTORS
George W. Stearns
& Ralph E. Montijo

BY Morris A. Lebtin

ATTORNEY 2,885,548
Patented May 5, 1959

2,885,548

POWER SWITCHING NETWORK

George W. Stearns, Camden, and Ralph E. Montijo, West Collingswood, N.J., assignors to Radio Corporation of America, a corporation of Delaware Application May 26, 1954, Serial No. 432,476

3 Claims. (Cl. 250—27)

This invention relates to switching networks, and particularly to high speed power switching networks.

In present day electronic information handling and computing systems, magnetic tape transport mechanisms having high accelerating and decelerating rates are employed. The amplitude of the signal induced in a reading head by a magnetized spot is proportional to the tape velocity. Therefore, the density with which the information may be encoded on a tape is also a factor of the start-stop time of the tape driving mechanism because a blank portion of tape must be provided between blocks of information in order to allow the tape to accelerate to a proper recording velocity before the first character of a block of information passes beneath a reading head.

Further, during operation of the system, it is necessary to start and stop the tape often: for example, during a sorting operation, the tape may be started and a block of information read from the tape, whereupon the tape is stopped—the start-stop cycle being repeated for each block of information encoded on the tape. Thus, the rate with which the information may be read into or out of the system is dependent to a large extent on the start-stop characteristics of the tape transport mechanism.

To accomplish the high acceleration and deceleration rates, one high speed tape transport mechanism utilizes a so-called inertia-less tape drive wherein only a small portion of tape which is stored in a bin receives the accelerating force. The tape is threaded over two oppositely rotating capstans. The captan rotating in one direction or sense is used to pull the tape over the reading head in a left-to-right direction. Conversely, the capstan rotating in the other direction is used to pull the tape over the reading head in a right-to-left direction. Two tape strippers are provided, one adjacent to each of the rotating capstans. The function of the strippers is to guide the tape before and after it reaches a capstan.

An erase head is fixedly mounted intermediate the two rotating capstans. A movable brake pressure pad is located adjacent the erase head and serves to force the moving tape against the fixed surface of the erase head, thereby braking the tape to a stop.

Two idler rollers or pressure rollers are also provided, one associated with each of the capstans. When a pressure roller is actuated, it forces the tape against the surface of a rotating capstan, which operates to drive the tape in the desired direction. During operation, when it is desired to stop the tape, the brake actuator causes the pressure pad over the erase head to exert a large force on the erase head such as to clamp the tape between the pad and the erase head.

The actuating mechanism for each of the pressure rollers and brake pressure pad is a separate dynamic voice coil connected by a mechanical linkage to the respective pressure rollers and brake actuators. Alternatively, the actuating mechanism may be a high-speed solenoid, the moving portion of which is coupled to the respective pressure rollers and brake actuator. Each dynamic voice coil is suspended in the magnetic field of a permanent magnet. The forces required for rapid acceleration and braking of a length of tape are relatively high, and a heavy surge of direct current is required to actuate the voice coil with sufficient force to provide the high acceleration and deceleration rates. In addition, the rise time of the current supplied to the dynamic voice coil should be fast in order to reduce the response time of the dynamic voice coil and associated linkage.

The initial source of a particular start and stop signal is a conventional flip-flop circuit located within the information handling or computing machine. The conventional flip-flop used in most digital machines supplies a low level direct current voltage. For example, the voltage swing when the flip-flop is switched from its reset to its set condition may be of the order of from 10 to 20 volts. Thus, the voltage swing of the flip-flop furnishing the start-stop signals is insufficient to drive the dynamic voice coil with the required force because the dynamic voice coil may require a current surge in the order of one and one-half amperes, in order to exert the necessary force.

Furthermore, the internal arrangement may be such that the start-stop signal of the flip-flop is required to operate or prime other units within the information handling or computing systems, particularly in machines using diode logic. Thus, the start signal may be used to open a recirculation loop in a memory unit associated with one of the input tapes. Therefore, it is not desirable to design a special flip-flop to drive a high current driving tube which is biased well below its cut-off point.

In addition, the present day information handling and computing systems may have a large number of input and output tapes associated therewith. Thus, it is undesirable that the source which furnishes the direct current to the dynamic voice coil draw current when it is in a standby condition, because of the power waste.

Therefore, it is an object of the present invention to provide a power switching network which is responsive to a low level direct current input voltage to furnish a heavy surge of direct current at its output.

Another object of the present invention is to provide a power switching network which is responsive to a low level direct current input voltage, yet furnishes a heavy surge of direct current having a very fast rise time.

Still, another object of the present invention is to provide an improved switching network which operates with a rapid response time but does not require standby current.

In accordance with the invention, there is provided a switch means which is responsive to the low level input voltage. The output voltage of the switch tube is coupled to an amplifier. A portion of the output voltage supplied by the amplifier is fed back to the cathode of the switch tube in a degenerative direction.

However, the plate voltage drop of the switch tube is applied as a positive voltage to the grid of the amplifier tube due to the coupling between the plate of the switch tube and the control grid of the amplifier tube. Therefore, the overall loop gain is markedly increased. Thus the switch tube serves a dual function. The first function is to supply initial starting and stopping impulses, and the second function is to open and close the feedback loop upon which the power gain is dependent.

The above and further objects of the present invention will be more fully apparent from the following detailed description taken in connection with the accompanying drawing in which.

Figure 1:
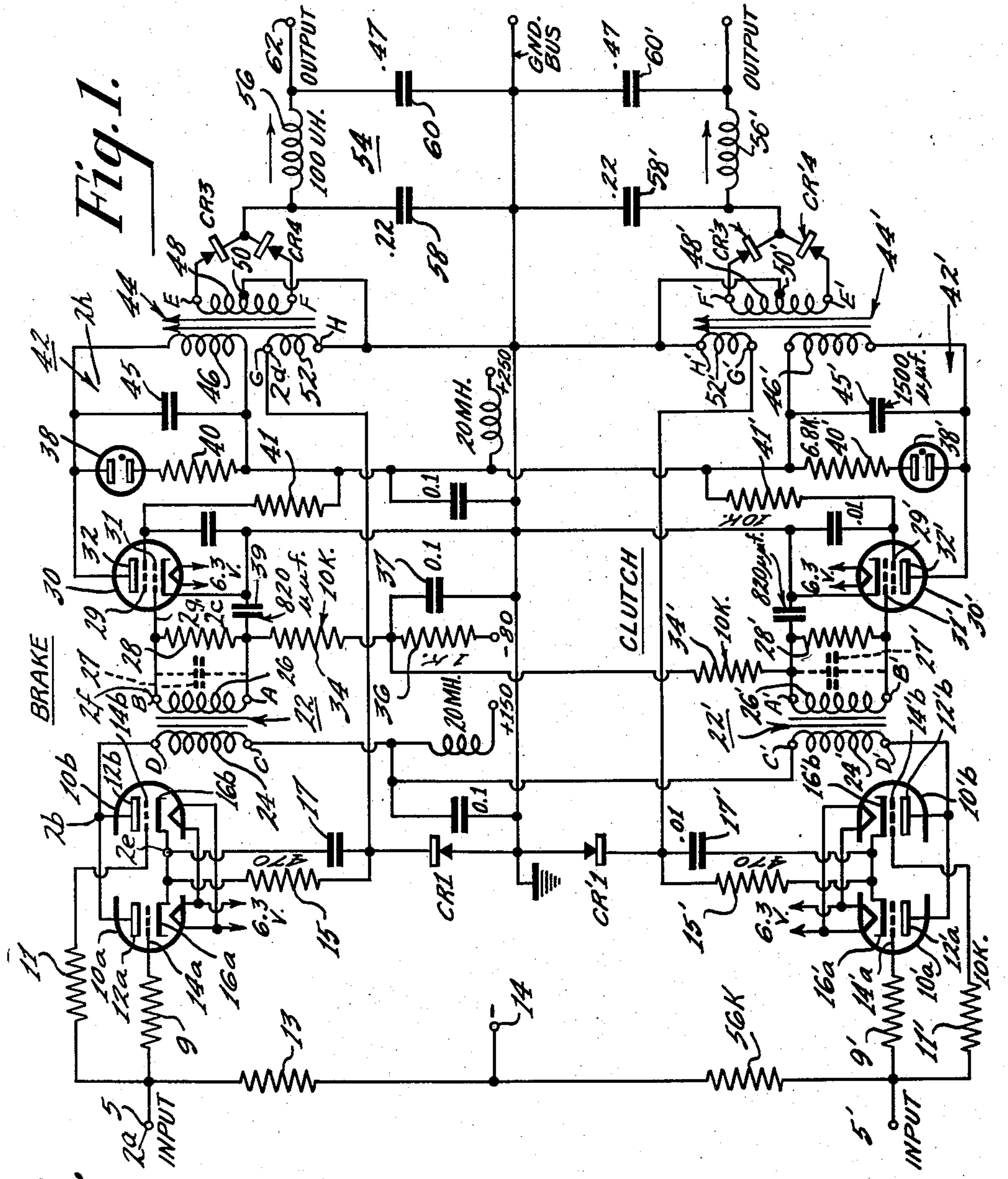
Fig. 1 is a diagrammatic illustration of an embodiment of the invention.

Referring to Fig. 1 of the drawing, two similar dynamic coil actuating circuits are shown. The circuit of the upper-half of the drawing is employed with the dynamic coil associated with a brake, and the circuit of the lower half of the drawing is employed with the dynamic coil associated with a pressure roller or clutch. Only the brake circuit need be described in detail because the description is also applicable to the clutch circuit.

The D.C. step impulse appears at input 5 and is directly coupled via resistors 9 and 11 to the control grids 14*a* and 14*b* of parallel triodes 10*a* and 10*b* respectively. The paralleled triodes 10*a* and 10*b* may be the twin halves of a type 6211 vacuum tube. The purpose of paralleling the triode tubes 10*a* and 10*b* is to obtain a high derating factor. It is a common practice to derate the vacuum tubes employed in an information handling or computing system by as much as 50 to 75 percent of the rated value of the tube, in order to obtain longer tube life and enhanced reliability. However, a single vacuum tube may be substituted for the paralleled triodes 10*a* and 10*b*, if desired.

A grid biasing potential of 14 volts negative is applied to the control grids 14*a* and 14*b* of triode tubes 10*a* and 10*b* via resistors 13 and 9, and 13 and 11, respectively. Grid current limiting resistors 9 and 11 are placed in the grid circuits of tubes 10*a* and 10*b* respectively in order to reduce the grid current when the grids are driven positive. The cathodes 16*a* and 16*b* are connected in parallel to one terminal of a cathode resistor 15. The other terminal of the cathode resistor 15 is connected to the cathode of a feedback crystal diode CR1. Capacitor 17 is a conventional bypass capacitor and is connected across resistor 15. The anode of crystal diode CR1 is connected to a ground or common bus, conventionally indicated. The crystal diode CR1 may be a conventional crystal or vacuum diode having a low forward resistance and a high back resistance. The anodes 12*a* and 12*b* of triode tubes 10*a* and 10*b* are connected in parallel to one terminal D of the primary side of a transformer 22. The other terminal C of the primary side of transformer 22 is connected to a positive voltage supply through a conventional R-F choke coil as shown.

Transformer 22 has step-up ratio of approximately 2.5:1. The secondary winding 26 of transformer 22 is connected in such a sense that when current flow in the primary increases (in conventional flow sense) from C to D, then a voltage is induced in the secondary winding 26 with the terminal A positive with respect to terminal B. The distributed capacitance of the secondary winding 26 of transformer 22 is shown in dotted form as a capacitor 27 connected in parallel with winding 26. A resistor 28 is connected across the secondary winding 26 of transformer 22. One terminal of resistor 28 is connected directly to the control grid 31 of amplifier tube 30. The other terminal of resistor 28 is connected to the cathode of amplifier tube 30 and to the ground bus via a blocking capacitor 39, and to the upper terminal of a resistor 34.

The control grid 31 of amplifier tube 30 is connected to a negative biasing source via resistors 28 and 34. The lower terminal of resistor 34 (as viewed in the drawing) is connected to a decoupling network composed of resistor 36 and capacitor 37. The anode 32 of amplifier tube 30 is connected to one terminal of a tank circuit 42 composed of a primary winding 46 of output transformer 44 and a capacitor 45. The other terminal of the tank circuit 42 is connected to a positive voltage supply via an R.F. choke coil as shown. The screen grid 29 of amplifier tube 30 is also connected to the positive voltage supply via dropping resistor 41.

A neon tube 38 is connected in series with resistor 40, both being connected across the tank circuit 42. When the amplifier tube 30 conducts, the breakdown voltage of the neon tube 38 is exceeded and the neon tube 38 begins to conduct thereby furnishing a visual indication that the switching circuit has been activated.

Transformer 44 has two secondary windings 48 and 52. The secondary winding 48 is used to furnish the output current, and the secondary winding 52 is used to furnish the feedback voltage. The midpoint 50 of secondary winding 48 is connected to the ground bus. Each of the ends E and F of the secondary winding 48 is connected to the anode of a rectifying diode CR3 and CR4 respectively. The cathodes of rectifying diodes CR3 and CR4 are connected together to the input side of a filter circuit 54. The filter circuit 54 is composed of a series inductance 56 and the shunt capacitors 58 and 60. The output voltage of the filter circuit 54 appears between the output terminal 62 and the ground bus. The rectifying diodes CR3 and CR4 may be vacuum tube diodes or crystal diodes or selenium diodes. The primary winding 46 and the secondary winding 48 of transformer 44 have a voltage step-down ratio in order to increase the high current output furnished by the switching circuit. The secondary winding 52 of transformer 44 is also connected in a voltage step-down fashion because only a portion of the output voltage of the amplifier tube 30 is required in the feedback loop.

One terminal G of the secondary winding 52 is connected to the cathode of the feedback diode CR1, and the other terminal H of the secondary winding 52 is connected to the ground bus.

The connections of the clutch circuit, shown at the bottom of Fig. 1, are the same as those described for the brake circuit and corresponding reference numbers with a prime are used.

Figure 2:
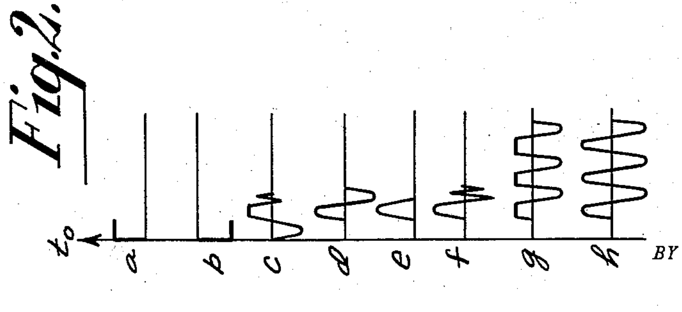
Fig. 2 is a timing diagram illustrating with idealized waveshapes the operation of the circuit in response to a low level step impulse.

In operation, a positive D.C. step impulse waveform, shown at line *a* of Fig. 2, is applied to input 5. The amplitude of the step impulse may be in the order of 15 to 20 volts, which is easily supplied by a conventional flip-flop. The positive input voltage is applied in parallel to the control grids 14*a* and 14*b* of triodes 10*a* and 10*b* causing the triode tubes to begin conducting. The points at which the waveforms illustrated in Figure 2 appear in Figure 1 are indicated (in the upper half of Figure 1 only) by the several reference numerals 2*a* to 2*h* inclusive corresponding respectively to the Figure 2 waveforms *a* to *h* inclusive. The drop in anode voltage of the triodes 10*a* and 10*b* is shown at line *b* of Fig. 2. The anode voltage drop is applied across the secondary winding 26 of transformer 22 as a negative half cycle followed by a positive half cycle with some additional cycles which are rapidly damped out as shown at line *c* of Fig. 2. The voltage wave at line *c* of Fig. 2 is the result of the distributed capacitance 27 (Fig. 1) of the secondary winding 26 causing a ringing effect due to the sudden change in voltage across the secondary winding 26. The waveform *c* of Fig. 2 is applied to the control grid 31 of amplifier tube 30. The negative half cycle has no effect on the amplifier tube 30 because the amplifier tube 30 is already biased beyond its cut-off point. However, the following positive half cycle of voltage wave *c* of Fig. 2 brings the bias of amplifier tube 30 above its cut-off point and the amplifier tube begins to conduct with a corresponding fall in its anode potential. The sudden fall in the anode potential of amplifier tube 30 is applied across the tank circuit 42. Thus, tank circuit 42 is shock excited by the sudden drop in anode potential of amplifier tube 30. The voltage wave of the tank circuit appears at the primary winding 46 of transformer 44 as a negative half cycle followed by a positive half cycle. The voltage induced in the secondary winding 48 is rectified by crystal diodes CR3 and CR4 and is applied to the filter circuit 54 appearing at the output terminal 62 as a rectified D.C. voltage. The voltage wave induced in secondary winding 52 as it appears at terminal G with respect to ground is shown as waveform *d* of Fig. 2.

The diode rectifier CR1 is arranged across the secondary winding 52 with its cathode connected at terminal G and its anode connected at terminal H. Thus, the diode CR1 offers a high resistance to the positive half cycle, and a very low resistance to the succeeding negative half cycle when the diode begins to conduct. The positive half cycle is applied to the cathodes 16*a* and 16*b* of triode tubes 10*a* and 10*b* and the negative half cycle is bypassed to the ground bus through the diode CR1. The voltage at the cathodes 16*a* and 16*b* is shown as the waveform at line *e* of Fig. 2.

The application of a positive voltage to the cathodes 16*a* and 16*b* of the triodes 10*a* and 10*b* has the same effect as though the control grids 14*a* and 14*b* were biased more negative. Therefore, the anode potential of the triode tubes 10*a* and 10*b* is suddenly increased and appears across the primary winding 24 of transformer 22 as a positive voltage pulse. The voltage induced in the secondary winding 26 of transformer 22 is also a positive pulse followed by a few cycles of R.F. frequency due to the distributed capacitance 27 of the secondary winding 26. The voltage induced in the secondary winding 26 is applied to the control grid 31 of amplifier tube 30. The latter voltage waveform is shown as waveform *f* of Fig. 2 and again the negative half cycle is caused by the distributed capacitance 27 of the secondary winding 26.

The response of the amplifier tube 30, the tank circuit 42, the feedback secondary winding 52 and the diode CR1 to the subsequent impulses is the same as described in connection with the original step-input voltage. The resulting waveform appearing at the grid 31 of amplifier tube 30 is shown in waveform *g* of Fig. 2. The voltage wave appearing in the tank circuit 42 is substantially a sinusoidal wave as shown in waveform *h* of Fig. 2. The advantage derived from connecting the cathode of the diode CR1 to the cathodes of the triode tubes 10*a* and 10*b* is that a larger change in anode voltage is obtained thereby. This larger change in anode voltage may be explained by considering the condition of the triode tubes 10*a* and 10*b* when the voltage wave appears at their cathodes. Because of the positive input voltage applied at the control grids 14*a* and 14*b* of the triodes 10*a* and 10*b*, the plate current of the triodes is at or near the saturation level of the tubes. Therefore, it is of no advantage to swing the control grids more positive (or the cathodes more negatively) as there would be very little resultant change in the plate current. However, a great change in plate current is obtained by driving the control grids more negatively or the cathodes more positively. By connecting the cathode of the diode CR1 to the cathodes of the triode tubes 10*a* and 10*b*, the nearly useless negative cathode drive is suppressed without detracting from the positive cathode drive. At the same time, by limiting the feed-back by the suppression, a uniform amplitude sinusoidal wave results.

The rise and fall time of the output voltage is limited only by the frequency to which the tank circuit 42 is tuned. In the present embodiment, where the output voltage is used to drive a dynamic voice coil, the tank circuit is tuned to a frequency of 100 kilocycles. However, in the situation where a faster acting element such as a high speed relay is to be driven, the tank circuit may be tuned to a higher frequency, thereby increasing the rise and fall times of the output voltage.

Further, because the output coupling to the load is a transformer, the circuit is easily adaptable to efficiently drive loads of various impedances. Likewise, the power tube 30 is used at a very high efficiency. The same low level input switching voltage can be used to drive an amplifier tube of increased power handling capacity by increasing the gain of the switching tubes 10*a* and 10*b* and/or by increasing the step-up ratio of transformer 22.

In addition, by connecting the diode CR1 so as to suppress the negative portion of the waveform *d* of Fig. 2, the response of the switching circuit to the removal of the input signal is improved. This improvement results from the fact that the negative portion of the waveform *d* acts to drive the control grids 14*a* and 14*b* of the triodes 10*a* and 10*b* more positive with respect to their respective cathodes; therefore, the negative portion of the waveform tends to make the circuit sluggish when responding to the removal of the start signal, and in the worst condition, the circuit might even continue to oscillate.

Thus, a novel and useful electronic switching circuit has been described. Although the description has assumed a dynamic voice coil to be the output load, this is not to be construed as a limiting feature. The present invention is especially useful in the situation where a low level input voltage is intended to drive an output load requiring either a heavy driving power or a fast voltage rise and fall time requirement or both.

What is claimed is:

1. A power switching circuit for providing a heavy surge of direct current in a load circuit in response to a low level switching signal comprising an electronic switch having at least a cathode, anode and a control grid, said switch being normally biased to cut-off condition and being responsive to said switching signal, a unilateral conducting device having a cathode and an anode, means to connect the cathode of said electronic switch in series with the cathode of said unilateral conducting device, a reference level, means to connect the anode of said unilateral conducting device to said reference level, a first positive supply voltage, a first transformer having a primary winding and a secondary winding, means to connect the primary winding of said first transformer in a series relation to said first positive supply voltage and to the anode of said electronic switch, an amplifying tube having at least an anode, a cathode and a control grid, a negative supply voltage, means to connect said amplifying control grid to said negative supply voltage, means to connect the secondary winding of said first transformer to said amplifying tube control grid and cathode such that a voltage originally induced in the primary winding is applied to the control grid of said amplifying tube in a cophaseal direction, a second transformer having a primary winding and an output winding and a feedback winding, a tuned circuit including the primary winding of said second transformer and a capacitor connected in parallel thereto, a second positive supply voltage, means to connect the tuned circuit in a series relation to said second positive supply voltage and to the anode of said amplifying tube, means to connect said feedback winding across said unilateral conductive device, and means including a full wave rectifier and a filter circuit to connect said output winding to a load circuit, whereby said surge of direct current to said load circuit has a fast rise time.

2. An electronic switching circuit comprising an electronic switch having a cathode, an anode, and a control grid, said switch being normally biased to cut-off condition and being responsive to a switch signal, a unilateral conducting device having a cathode and an anode, means to connect the cathode of said electronic switch in series with the cathode of said unilateral conducting device, means to connect the anode of said unilateral conducting device to a reference level, a first transformer having a primary winding and a secondary winding, means to connect the primary winding of said first transformer in a series relation to a first positive supply voltage and to the anode of said electronic switch, an amplifying tube having an anode, a cathode, and a control grid, means to connect said amplifying control grid to a negative supply voltage, means to connect the secondary winding of said first transformer to said amplifying tube control grid and cathode such that a voltage originally induced in the primary winding is applied to the control grid of said amplifying tube in a cophaseal direction, a second transformer having a primary winding and an output winding and a feedback winding, a circuit including the primary winding of said second transformer and a capacitor connected in parallel thereto, means to connect the tuned circuit in a series relation to a second positive supply voltage and to the anode of said amplifying tube, means to connect said feedback winding across said unilateral conducting device, and means including a full wave rectifier and a filter circuit to connect said output winding to a load circuit.

3. A power switching network comprising a first electronic discharge device having a first electrode, an output electrode, and a control electrode; means for applying a low level signal to said input electrode; means for biasing said first device in a nonconducting state in the absence of said signal; a unilateral conducting device having an anode and a cathode, said cathode being connected to said first electrode; a point of reference potential, said anode being connected to said point; a first transformer having a primary winding and a secondary winding, one terminal of said primary winding being connected to said output electrode; a second electron discharge device having a first electrode, a control electrode and an output electrode, said secondary winding being connected between said control electrode and said first electrode of said second device such that a voltage induced in said primary winding is applied to said control electrode of said second device in a cophaseal direction; means for biasing said second device in a nonconducting state in the absence of a signal of the proper polarity coupled across said transformer; a second transformer having a primary winding and a feedback winding; and a tuned circuit comprising said primary winding of said second transformer and a capacitor connected in parallel, said tuned circuit being connected between said first and said output electrodes of said second device, said feedback winding being connected in parallel with said unilateral conducting device for providing degenerative feedback to said first device whereby oscillations in said tuned circuit are substained during the application of said low level signal to said first device.

References Cited in the file of this patent

UNITED STATES PATENTS

| | | |
|---|---|---|
| 1,823,837 | Meissner | Sept. 15, 1931 |
| 2,141,343 | Campbell | Dec. 27, 1938 |
| 2,277,000 | Bingley | Mar. 17, 1942 |
| 2,413,182 | Hollingsworth | Dec. 24, 1946 |
| 2,415,302 | Maxwell | Feb. 4, 1947 |
| 2,496,980 | Blumlein | Feb. 7, 1950 |
| 2,512,750 | Potter | June 27, 1950 |
| 2,635,185 | Casey | Apr. 14, 1953 |
| 2,795,696 | Evans | June 11, 1957 |